United States Patent
Ahn et al.

(10) Patent No.: US 11,470,643 B2
(45) Date of Patent: *Oct. 11, 2022

(54) WIRELESS COMMUNICATION TERMINAL AND WIRELESS COMMUNICATION METHOD FOR RANDOM ACCESS-BASED UPLINK MULTI-USER TRANSMISSION

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Gyeonggi-do (KR); Juhyung Son, Gyeonggi-do (KR); Jinsam Kwak, Gyeonggi-do (KR); Geonjung Ko, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,880

(22) Filed: Nov. 22, 2020

(65) Prior Publication Data
US 2021/0076423 A1   Mar. 11, 2021

Related U.S. Application Data

(63) Continuation of application No. 16/188,274, filed on Nov. 12, 2018, now Pat. No. 10,880,924, which is a
(Continued)

(30) Foreign Application Priority Data

May 11, 2016 (KR) .......................... 10-2016-0057759
Sep. 13, 2016 (KR) .......................... 10-2016-0117898
Jan. 9, 2017 (KR) .......................... 10-2017-0002720

(51) Int. Cl.
*H04W 74/08* (2009.01)
*H04W 84/12* (2009.01)

(52) U.S. Cl.
CPC ....... *H04W 74/0816* (2013.01); *H04W 74/08* (2013.01); *H04W 74/0833* (2013.01); *H04W 84/12* (2013.01); *H04W 74/0808* (2013.01)

(58) Field of Classification Search
CPC . H04W 74/0816; H04W 74/08; H04W 74/04; H04W 84/12
See application file for complete search history.

(56) References Cited

U.S. PATENT DOCUMENTS

2003/0145095 A1   7/2003   Liu et al.
2008/0212612 A1   9/2008   Singh et al.
(Continued)

FOREIGN PATENT DOCUMENTS

CN   101998646   3/2011
CN   103563457   2/2014
(Continued)

OTHER PUBLICATIONS

International Search Report for PCT/KR2017/004889 dated Sep. 15, 2017 and its English translation from WIPO (now published as WO 2017/196104).
(Continued)

*Primary Examiner* — Shukri Taha
(74) *Attorney, Agent, or Firm* — Ladas & Parry, LLP

(57) ABSTRACT

Provided are a wireless communication terminal including: a processor; and a communication unit, wherein the processor obtains a backoff counter for an OFDMA-based random access of the terminal, wherein the backoff counter is obtained within a range of a contention window for the uplink OFDMA-based random access, receives a trigger frame indicating an uplink multi-user transmission, when
(Continued)

one or more resource unit(s) in which random access can be performed is indicated by the trigger frame, decrements the backoff counter based on a number of resource units(s) in which random access can be performed, and when the backoff counter is 0 or decremented to 0, performs an uplink multi-user transmission through a selected resource unit among the resource units(s) and a wireless communication method using the same.

20 Claims, 12 Drawing Sheets

Related U.S. Application Data continuation of application No. PCT/KR2017/004889, filed on May 11, 2017.

(56) References Cited

U.S. PATENT DOCUMENTS

| | | |
|---|---|---|
| 2010/0150116 A1 | 6/2010 | Ji et al. |
| 2012/0106371 A1 | 5/2012 | Abraham et al. |
| 2014/0254552 A1 | 9/2014 | Hayes et al. |
| 2014/0314060 A1 | 10/2014 | Park et al. |
| 2015/0124689 A1 | 5/2015 | Merlin et al. |
| 2015/0124690 A1 | 5/2015 | Merlin et al. |
| 2015/0146648 A1* | 5/2015 | Viger ............... H04L 1/1685 370/329 |
| 2015/0245382 A1 | 8/2015 | Park et al. |
| 2015/0295680 A1 | 10/2015 | Othman et al. |
| 2016/0057657 A1 | 2/2016 | Seok |
| 2016/0066257 A1 | 3/2016 | Liu et al. |
| 2016/0080115 A1 | 3/2016 | Joshiam et al. |
| 2016/0112987 A1 | 4/2016 | Patil et al. |
| 2016/0113009 A1 | 4/2016 | Seok |
| 2016/0113034 A1 | 4/2016 | Seok |
| 2016/0127020 A1 | 5/2016 | Abraham et al. |
| 2016/0128024 A1 | 5/2016 | Frederiks et al. |
| 2016/0142185 A1 | 5/2016 | Merlin et al. |
| 2016/0227579 A1* | 8/2016 | Stacey ............ H04W 74/0833 |
| 2016/0302229 A1 | 10/2016 | Hedayat |
| 2016/0309508 A1 | 10/2016 | Li et al. |
| 2016/0315681 A1 | 10/2016 | Moon et al. |
| 2016/0316458 A1* | 10/2016 | Kwon ............... H04L 5/0053 |
| 2016/0330753 A1 | 11/2016 | Jauh et al. |
| 2017/0019909 A1* | 1/2017 | Si .................... H04W 76/28 |
| 2017/0048048 A1 | 2/2017 | Seok |
| 2017/0079071 A1 | 3/2017 | Zhou et al. |
| 2017/0202023 A1 | 7/2017 | Zhou et al. |
| 2017/0230981 A1 | 8/2017 | Ryu et al. |
| 2017/0257196 A1 | 9/2017 | Ghosh et al. |
| 2017/0257887 A1 | 9/2017 | Ghosh et al. |
| 2017/0272138 A1 | 9/2017 | Chun et al. |
| 2017/0289911 A1 | 10/2017 | Kim et al. |
| 2017/0303280 A1 | 10/2017 | Chun et al. |
| 2017/0310446 A1 | 10/2017 | Asterjadhi et al. |
| 2017/0310448 A1 | 10/2017 | Kim et al. |
| 2017/0325264 A1 | 11/2017 | Cherian et al. |
| 2018/0045821 A1 | 2/2018 | Lee et al. |
| 2018/0084605 A1 | 3/2018 | Li et al. |
| 2018/0092032 A1 | 3/2018 | Choi et al. |
| 2018/0124858 A1 | 5/2018 | Gan et al. |
| 2018/0145801 A1 | 5/2018 | Wang et al. |
| 2018/0167882 A1* | 6/2018 | Choi ................ H04W 72/121 |
| 2018/0183548 A1 | 6/2018 | Gan et al. |
| 2018/0199271 A1 | 7/2018 | Viger et al. |
| 2018/0302924 A1 | 10/2018 | Kim et al. |
| 2018/0368178 A1 | 12/2018 | Dong |
| 2019/0069299 A1 | 2/2019 | Li et al. |
| 2019/0082468 A1 | 3/2019 | Ahn et al. |
| 2019/0182864 A1 | 6/2019 | Huang et al. |
| 2019/0313453 A1 | 10/2019 | Baron et al. |

FOREIGN PATENT DOCUMENTS

| | | |
|---|---|---|
| CN | 104065452 | 9/2014 |
| CN | 104255068 | 12/2014 |
| CN | 104321995 | 1/2015 |
| CN | 104521290 | 4/2015 |
| CN | 104871630 | 8/2015 |
| CN | 105830506 | 8/2016 |
| CN | 106233790 | 12/2016 |
| CN | 109644447 | 4/2019 |
| GB | 201518866 | 12/2015 |
| IN | 201847021036 | 6/2018 |
| JP | 2006-217242 | 8/2006 |
| JP | 2017-85553 | 5/2017 |
| JP | 2018-509024 | 3/2018 |
| JP | 2019-512917 | 5/2019 |
| KR | 10-2006-0018403 | 3/2006 |
| KR | 10-2011-0074747 | 7/2011 |
| KR | 10-2013-0009959 | 1/2013 |
| KR | 10-2013-0090804 | 8/2013 |
| KR | 10-2014-0085380 | 7/2014 |
| KR | 10-2015-0011345 | 1/2015 |
| KR | 10-2015-0013465 | 2/2015 |
| KR | 10-2015-0073165 | 6/2015 |
| KR | 10-2015-0115662 | 10/2015 |
| KR | 10-2016-0022790 | 3/2016 |
| KR | 10-2016-0028354 | 3/2016 |
| KR | 10-2016-0031954 | 3/2016 |
| KR | 10-2016-0045023 | 4/2016 |
| KR | 10-2016-0052430 | 5/2016 |
| WO | 2014/098367 | 6/2014 |
| WO | 2015/194727 | 12/2015 |
| WO | 2015/199306 | 12/2015 |
| WO | 2016/007770 | 1/2016 |
| WO | 2016/028117 | 2/2016 |
| WO | 2016/068572 | 5/2016 |
| WO | 2016/069399 | 5/2016 |
| WO | 2016/112146 | 7/2016 |
| WO | 2016/123403 | 8/2016 |
| WO | 2016/163641 | 10/2016 |
| WO | 2016/198669 | 12/2016 |
| WO | 2017/196104 | 11/2017 |

OTHER PUBLICATIONS

Written Opinion of the International Searching Authority for PCT/KR2017/004889 dated Sep. 15, 2017 and its English translation by Google Translate (now published as WO 2017/196104).
Baron, Stephane, "Traffic Priority for Random Multi User Uplink OFDMA", IEEE 802.11-15/1280r1, slides 1-24, Nov. 9, 2015. See slides 2, 4, 10, 16, 20.
Notice of Allowance dated Jul. 24, 2020 for Korean Patent Application No. 10-2019-7018197 and its English translation provided by Applicant's foreign counsel.
Office Action dated Sep. 3, 2020 for Korean Patent Application No. 10-2018-7033463 and its English translation provided by Applicant's foreign counsel.
Evgeny Khorov et al., "Considerations on Trigger Frame for Random Access Procedure", doc. IEEE 802.11-16/0399r1, Mar. 2016, slides 1-11.
Advisory Action dated Sep. 11, 2020 for U.S. Appl. No. 16/181,319.
Notice of Allowance dated Sep. 15, 2020 for Korean Patent Application No. 10-2020-7026125 and its English translation provided by Applicant's foreign counsel.
Office Action dated Sep. 22, 2020 for Indian Patent Application No. 201927007972.
Office Action dated Mar. 25, 2020 for Korean Patent Application No. 10-2019-7018197 and its English translation provided by Applicant's foreign counsel.
Office Action dated Jun. 9, 2020 for U.S. Appl. No. 16/181,319.
Notice of Allowance dated Jun. 18, 2020 for Korean Patent Application No. 10-2020-7002361 and its English translation provided by Applicant's foreign counsel.
Extended European Search Report dated May 12, 2020 for European Patent Application No. 17849113.0.

(56) References Cited

OTHER PUBLICATIONS

Office Action dated Jun. 23, 2020 for U.S. Appl. No. 16/294,883.
Laurent Cariou et al., "Proposed spec text for MU EDCA parameters", Wireless LANS IEEE P802.11-16/1180r0, Sep. 2016, pp. 1-8.
Notice of Allowance dated Jun. 22, 2020 for Japanese Patent Application No. 2019-500497 and its English translation provided by Applicant's foreign counsel.
Office Action dated Jun. 2, 2020 for Chinese Patent Application No. 201780080498.9 and its English translation provided by Applicant's foreign counsel.
Chittabrata Ghosh et al. "UL OFDMA-based Random Access Procedure", IEEE 802.11-15/1105r0, Sep. 14, 2015, slides 1-19.
Evgeny Khorov et al. "How to Build High Efficiency WLANs", 2015 International Conference Engineering and Telecommunication, IEEE 802.11ax; High Efficiency WLANs, Feb. 29, 2016, pp. 14-18
Notice of Allowance dated Jul. 6, 2020 for Japanese Patent Application No. 2019-555549 and its English translation provided by Applicant's foreign counsel.
Chittabrata Ghosh et al. "Location Measurement Protocol for Unassociated STAs", IEEE 802.11-16/1260r0, Sep. 13, 2016, slides 1-16.
Office Action dated Jun. 29, 2020 for Japanese Patent Application No. 2019-534619 and its English translation provided by Applicant's foreign counsel.
Office Action dated Jul. 24, 2020 for Indian Patent Application No. 201827041027.
Office Action dated Jul. 28, 2020 for U.S. Appl. No. 16/596,674.
Extended European Search Report dated Jul. 7, 2020 for European Patent Application No. 17889408.5.
LAN/MAN Standards Committee of the IEEE Computer Society: IEEE P802.11ax™/D1.0; Draft Standard for Information technology—Telecommunications and information exchange between systems Local and metropolitan area network—Specific requirements. Part 11: Wireless LAN Medium Access Control (MAC) and Physical Layer (PHY) Specifications. Amendment 6: Enhancements for High Efficiency WLAN, Nov. 2016, pp. 1-453.
Notice of Allowance dated Aug. 28, 2019 for U.S. Appl. No. 16/452,448.
Notice of Allowance dated Nov. 5, 2019 for Korean Patent Application No. 10-2018-7037247 and its English translation provided by Applicant's foreign counsel.
International Preliminary Report on Patentability (Chapter I) dated Nov. 13, 2018 for PCT/KR2017/004889 and its English translation from WIPO.
Notice of Allowance dated Jul. 10, 2019 for U.S. Appl. No. 16/233,078.
Non-Final Office Action dated Mar. 18, 2019 for U.S. Appl. No. 16/233,078.
Office Action dated Dec. 16, 2019 for Japanese Patent Application No. 2019-534619 and its English translation provided by the Applicant's foreign counsel.
Office Action dated Feb. 3, 2020 for Japanese Patent Application No. 2019-500497 and its English translation provided by the Applicant's foreign counsel.
Office Action dated Feb. 4, 2020 for U.S. Appl. No. 16/181,319.
Extended European Search Report dated Feb. 10, 2020 for European Patent Application No. 17824568.4.
Laurent Cariou et al. "2 Sets of EDCA Parameters", IEEE 802.11-16/0998r0, IEEE, Jul. 2016, Search Date Dec. 5, 2019, Internet URL: https://mentor.ieee.org/802.11/dcn/16/11-16-0998-00-00ax-rules-for-2-edcaparameters.pptx >. Slides 1-21.
Robert Stacey, "Specification Framework for TGax", IEEE 802.11-15/0132r17, IEE P802.11. Internet URL: https://mentor.ieee.org/802.11/dcn/15/11-15-0132-17-00ax-spec-framework.docx>, May 25, 2016, pp. 33-34.
Chittabrata Ghosh (INTEL): "Signaling of Multi-TID Aggregation Limit", IEEE 802.11-16/0667r0, Draft: 11-16-0667-00-00AX-SIGNALING-OF-MULTI-TID-AGGREGATION-LIMIT, IEEE-SA Mentor, Piscataway, NJ USA, vol. 802.11ax, May 16, 2016, pp. 1-16, XP068119549, Internet URL: https://mentor.ieee.org/802.11/dcn/16/11-16-0667-00-00ax-signaling-of-multi-tid-aggregation-limit.pptx (retrieved on May 16, 2016).
Chittabrata Ghosh (INTEL): "Multi-TID Aggregation Limit", IEEE 802.11-16/0362r1, Draft: 11-16-0362-01-00AX-MULTI-TID-AGGREGATION-LIMIT, IEEE-SA Mentor, Piscataway, NJ USA, vol. 802.11ax, No. 1, May 15, 2016, pp. 1-26, XP068105245, Internet URL: https://mentor.ieee.org/802.11/dcn/16/11-16-0667-00-00ax-signaling-of-multi-tid-aggregation-limit.pptx (retrieved on Mar. 15, 2016).
LAN/MAN Standards Committee Of The IEEE Computer Society; "Draft Standard for Information technology-tele-communications and information exchange between systems Local and metropolitan area networks—Specific requirements, Part 11: Wireless LAN Medium Access Control (MAC) and Physical Layer (PHY) Specifications. Amendment 6: Enhancements for high efficiency in frequency bands between 1 GHz and 6Ghz", IEEE Draft; Draft P802.11ax_D0.2, IEEE-SA, Piscataway, NJ USA, vol. 802.11ax drafts, No. D0.2, June 8, 2016. pp. 1-227, XP068137424, Retrieved from the Internet: URL: www.ieee802.org/11/private/Draft_Standards/11ax/Draft_P802.11ax_DO.2 pdf (Retrieved on Jun. 8, 2016).
Notice of Allowance dated Aug. 18, 2020 for U.S. Appl. No. 16/188,274 (now published as US 2019/0082468).
Non-Final Office Action dated Apr. 16, 2020 for U.S. Appl. No. 16/188,274 (now published as US 2019/0082468).
Office Action dated Aug. 4, 2021 for Chinese Patent Application No. 201780080498.9 and its English translation provided by the Applicant's foreign counsel.
Advisory Action dated Sep. 2, 2021 for U.S. Appl. No. 16/181,319.
Office Action dated Sep. 13, 2021 for Japanese Patent Application No. 2020-133107 and its English translation provided by the Applicant's foreign counsel.
Office Action dated Sep. 22, 2021 for Korean Patent Application No. 10-2019-7006093 and its English translation provided by the Applicant's foreign counsel.
Laurent Cariou et al., "Proposed spec text for MU EDCA parameters", Resolution for CID 9058 and 90750, Sep. 1, 2016. See pp. 1-7.
Office Action dated Mar. 3, 2021 for Chinese Patent Application No. 201780080498.9 and its English translation provided by Applicant's foreign counsel.
Notice of Allowance dated Mar. 8, 2021 for Korean Patent Application No. 10-2018-7033463 and its English translation provided by Applicant's foreign counsel.
Office Action dated Mar. 22, 2021 for Korean Patent Application No. 10-2019-7006093 and its English translation provided by Applicant's foreign counsel.
"Proposed spec text for MU EDCA parameters", IEEE P802.11, Wireless LANs, Resolution for CID 9058 and 90750, Sep. 2016, pp. 1-8.
Notice of Allowance dated Apr. 8, 2021 for Chinese Patent Application No. 201780028603.4 and its English translation provided by Applicant's foreign counsel.
Office Action dated Apr. 27, 2021 for Korean Patent Application No. 10-2021-7007541 and its English translation provided by Applicant's foreign counsel.
Office Action dated Apr. 30, 2021 for European Patent Application No. 17889408.5.
LAN/MAN Standards Committee of the IEEE Computer Society: IEEE P802.11ax™/D1.0; "Draft Standard for Information technology—Telecommunications and information exchange between systems Local and metropolitan area networks—Specific requirements". Part 11: Wireless LAN Medium Access Control (MAC) and Physical Layer (PHY) Specifications. Amendment 6: Enhancements for High Efficiency WLAN. Nov. 2016, pp. 1-453.
Evgeny Khorov et al. "How to Build High Efficiency WLANs", 2015 International Conference Engineering and Telecommunication, IEEE 802.11ax; High Efficiency WLANs, Feb. 29, 2016, Date of Conference: November 18-19, 2015, Moscow, Russia, pp. 14-18.
Office Action dated May 13, 2021 for U.S. Appl. No. 16/181,319.
Office Action dated Apr. 19, 2021 for European Patent Application No. 17 824 568.4.

(56) References Cited

OTHER PUBLICATIONS

Office Action dated Jun. 14, 2021 for Japanese Patent Application No. 2020-125359 and its English translation provided by the Applicant's foreign counsel.
Kiseon Ryu, "Ack Policy for UL MU Ack transmission", IEEE 802.11-15/1346r1, Internet URL:https://mentor.ieee.org/802.11/dcn/15/11-15-1346-01-00ax-ack-policy-for-ul-mu-ack-transmission. ppx, Nov. 8, 2015.
Po-Kai Huang (Intel), Comment Resolution on Trigger Frame Format—MU-RTS Variant, IEEE 802.11-16/0808r0, Internet URL:https://mentor.ieee.org/802.11/dcn/16/11-16-0808-00-00ax-comment-resolution-on-trieegr-frame-format-mu-rts-variant.docs, Jun. 28, 2016.
Office Action dated Dec. 27, 2021 for Indian Patent Application No. 202128005900.
Office Action dated Dec. 9, 2021 for Chinese Patent Application No. 201780041848.0 and its English translation provided by Applicant's foreign counsel.
Notice of Allowance dated Dec. 13, 2021 for European Patent Application No. 17 824 568.4.
Office Action dated Oct. 4, 2021 for Japanese Patent Application No. 2019-534619 and its English translation provided by the Applicant's foreign counsel.
Office Action dated Oct. 4, 2021 for Japanese Patent Application No. 2020-133108 and its English translation provided by the Applicant's foreign counsel.
Office Action dated Oct. 25, 2021 for U.S. Appl. No. 16/935,858.
Office Action dated Nov. 2, 2021 for U.S. Appl. No. 16/181,319.
Office Action dated Nov. 9, 2021 for U.S. Appl. No. 17/101,755.
Chittabrata Ghosh (Intel), "Resolution for CIDs on UL OFDMA-based Random Access" IEEE 802.11-16/1222r0, Internet: <URL : https ://mentor.ieee.org/802.11/dcn/16/11-16-1222-00- 00ax-comment-resolution-on-ul-ofdma-random-access.docx> Sep. 12, 2016, pp. 1-13.
Liwen Chu et al. (Marvell), "Multiple BSSID and MU" Discussion, IEEE 802.11-16/1454r0, Internet: <URL : https : //mentor.ieee.org/802.11/dcn/16/11-16-1454-00. 00ax- multiple-bssid-and-mu-discussion.pptx>, Nov. 6, 2016, slides 1-10.
Robert Stacey et al. (Intel), "Proposed TGax draft specification", IEEE 802.11-16/0024r1, Internet: <URL : https : //mentor.ieee.org/802.11/dcn/16/11-16-0024-01. 00ax-proposed- draft-specification.docx>, Mar. 2, 2016, pp. 1-159.
Office Action dated Nov. 22, 2021 for Japanese Patent Application No. 2020-125359 and its English translation provided by Applicant's foreign counsel.
Office Action dated Nov. 22, 2021 for Japanese Patent Application No. 2020-125358 and its English translation provided by Applicant's foreign counsel.
Office Action dated Nov. 19, 2021 for Chinese Patent Application No. 201780036198.0 and its English translation provided by Applicant's foreign counsel.
Notice of Allowance dated Nov. 22, 2021 for European Patent Application No. 17 889 408.5.
Office Action dated Dec. 13, 2021 for Korean Patent Application No. 10-2018-7031427 and its English translation provided by Applicant's foreign counsel.
Notice of Allowance dated Dec. 13, 2021 for Korean Patent Application No. 10-2021-7017548 and its English translation provided by Applicant's foreign counsel.
Notice of Allowance dated Mar. 25, 2022 for U.S. Appl. No. 16/935,858.
Office Action dated Mar. 25, 2022 for Chinese Patent Application No. 201780054732.0 and its English translation provided by Applicant's foreign counsel.
Office Action dated Apr. 5, 2022 for U.S. Appl. No. 16/181,319.
George Cherian et al.: "CIDs for: Section 9.3.1.9.7 Multi STA BAs", IEEE 802.11-16/0024r1, Apr. 17, 2016, pp. 1-11.
George Cherian et al.: "CIDs for: Section 25.4/25.4.1 Selection of BlockAck and BlockAckReq variants", IEEE 802.11-16/0024r1, Apr. 17, 2016, pp. 1-11.
Office Action dated Apr. 6, 2022 for Indian Patent Application No. 202128024764.
Notice of Allowance dated Apr. 20, 2022 for Korean Patent Application No. 10-2022-7008125 and its English translation from Global Dossier.
Trial and Appeal Decision dated Apr. 25, 2022 for Japanese Patent Application No. 2019-534619 and its English translation provided by Applicant's foreign counsel.
Office Action dated Apr. 29, 2022 for Chinese Patent Application No. 201780036198.0 and its English translation from Global Dossier.
IEEE P802.11ax/D1.0: "High Efficiency (HE) MAC specification", IEEE-SA Piscataway, NJ, USA, Nov. 2016, pp. 1-65.
Office Action dated May 7, 2022 for Chinese Patent Application No. 201780041848.0 and its English translation provided by Applicant's foreign counsel.
Notice of Allowance dated May 18, 2022 for U.S. Appl. No. 17/101,755.
Corrected Notice of Allowance dated Jun. 15 and Jun. 2, 2022 for U.S. Appl. No. 17/101,755.
Notice of Allowance dated May 16, 2022 for Japanese Patent Application No. 2020-125358 and its English translation provided by Applicant's foreign counsel.
Notice of Allowance dated May 16, 2022 for Japanese Patent Application No. 2020-125359 and its English translation provided by Applicant's foreign counsel.
Corrected Notice of Allowance dated May 26, 2022 for U.S. Appl. No. 16/935,858.
Notice of Allowance dated Jun. 6, 2022 for Japanese Patent Application No. 2020-133108 and its English translation provided by Applicant's foreign counsel.
Office Action dated Jun. 13, 2022 for Korean Patent Application No. 10-2022-7013356 and its English translation provided by Applicant's foreign counsel.
Extended European Search Report dated May 13, 2022 for European Patent Application No. 22152570.2.
Notice of Allowance dated Jun. 23, 2022 for Korean Patent Application No. 10-2018-7031427 and its English translation provided by Applicant's foreign counsel.

* cited by examiner

WIRELESS COMMUNICATION TERMINAL AND WIRELESS COMMUNICATION METHOD FOR RANDOM ACCESS-BASED UPLINK MULTI-USER TRANSMISSION

CROSS-REFERENCE TO RELATED APPLICATIONS

This application is a continuation of U.S. patent application Ser. No. 16/188,274 filed on Nov. 12, 2018, which is a continuation of International Patent Application No. PCT/KR2017/004889 filed on May 11, 2017, which claims the priority to Korean Patent Application No. 10-2016-0057759 filed in the Korean Intellectual Property Office on May 11, 2016, Korean Patent Application No. 10-2016-0117898 filed in the Korean Intellectual Property Office on Sep. 13, 2016, and Korean Patent Application No. 10-2017-0002720 filed in the Korean Intellectual Property Office on Jan. 9, 2017, the entire contents of which are incorporated herein by reference.

TECHNICAL FIELD

The present invention relates to a wireless communication terminal and a wireless communication method for an uplink multi-user transmission based on random access, and more particularly, to a wireless communication terminal and a wireless communication method for efficiently performing contention for random access in an uplink multi-user transmission.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

In addition, the present invention has an object to efficiently manage a random access procedure of a plurality of terminals.

Technical Solution

In order to achieve the objects, the present invention provides a wireless communication method and a wireless communication terminal as below.

First, an exemplary embodiment of the present invention provides a wireless communication terminal, including a processor; and a communication unit, wherein the processor obtains a backoff counter for an uplink multi-user random access of the terminal, wherein the backoff counter is obtained within a range of a contention window for the uplink multi-user random access, receives a trigger frame indicating an uplink multi-user transmission, when the trigger frame indicates at least one resource unit allocated for random access, decrements the backoff counter based on a number of resource units(s) in which random access can be performed in response to the trigger frame, and when the backoff counter is 0 or decremented to 0, select at least one of resource units(s) allocated for the random access, and perform an uplink multi-user transmission through the selected resource unit.

In addition, an exemplary embodiment of the present invention provides a wireless communication method of a wireless communication terminal, including: obtaining a backoff counter for an uplink multi-user random access of the terminal, wherein the backoff counter is obtained within a range of a contention window for the uplink multi-user random access; receiving a trigger frame indicating an uplink multi-user transmission; when the trigger frame indicates at least one resource unit allocated for random access, decrementing the backoff counter based on a number of resource units(s) in which random access can be performed in response to the trigger frame, and when the backoff counter is 0 or decremented to 0, performing an uplink multi-user transmission through a selected resource unit among resource units(s) allocated for the random access.

When carrier sensing is required before the uplink multi-user transmission in response to the trigger frame, the processor performs carrier sensing on a channel containing the selected resource unit, and when the channel containing the selected resource unit is determined to be idle as a result of the carrier sensing, the processor transmit uplink multi-user data through the selected resource unit.

When the channel containing the selected resource unit is determined to be busy as a result of the carrier sensing, the processor does not transmit uplink multi-user data through the selected resource unit, and randomly obtains a new backoff counter for an uplink multi-user random access of the terminal within the range of the contention window, and participates in a subsequent uplink multi-user random access using the obtained new backoff counter.

The contention window for obtaining the new backoff counter has the same size as an existing contention window.

The carrier sensing is performed during a SIFS time between the trigger frame and a PHY protocol data unit (PPDU) transmitted in response to the trigger frame.

The processor decrements the backoff counter if the terminal has pending data to be transmitted to a base wireless communication terminal.

A minimum value of the contention window and a maximum value of the contention window for determining the contention window are transmitted through a random access parameter set.

The random access parameter set is included in a beacon and a probe response.

The uplink multi-user random access is an uplink OFDMA-based random access.

Advantageous Effects

According to an embodiment of the present invention, a random access procedure of a plurality of terminals can be efficiently managed.

According to an embodiment of the present invention, it is possible to reduce the probability of occurrence of a collision by preventing an excessive accumulation of terminals having a backoff counter of 0 for random access.

According to an embodiment of the present invention, it is possible to increase the total resource utilization rate in the contention-based channel access system and improve the performance of the wireless LAN system.

DETAILED DESCRIPTION OF THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2016-10057759, 10-2016-0117898 and 10-2017-0002720 filed in the Korean Intellectual Property Office and the embodiments and mentioned items described in the respective application, which forms the basis of the priority, shall be included in the Detailed Description of the present application.

Figure 1:
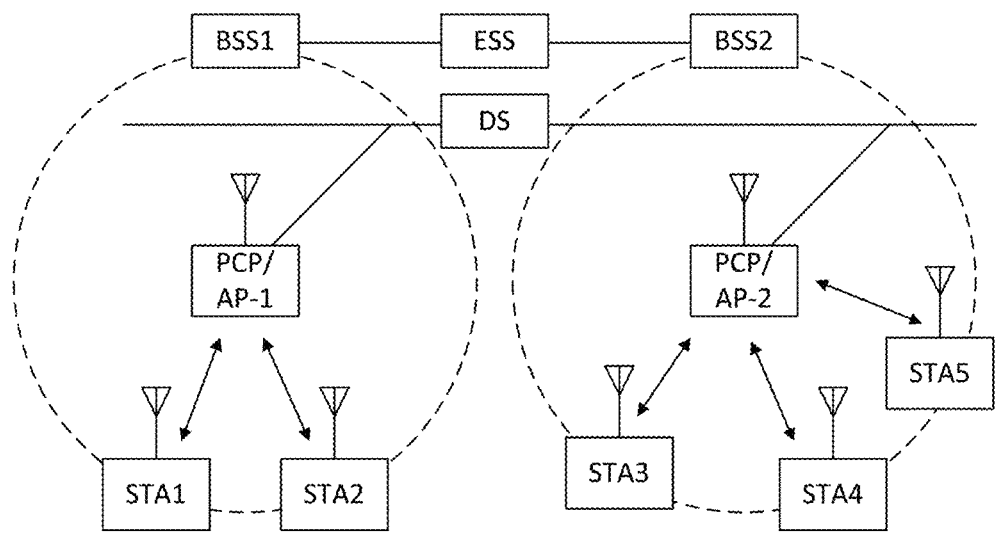
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
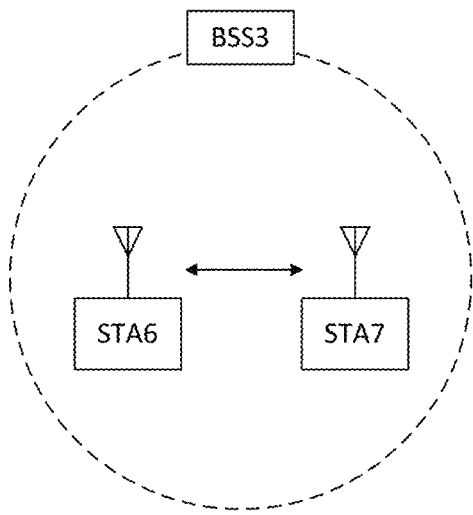
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
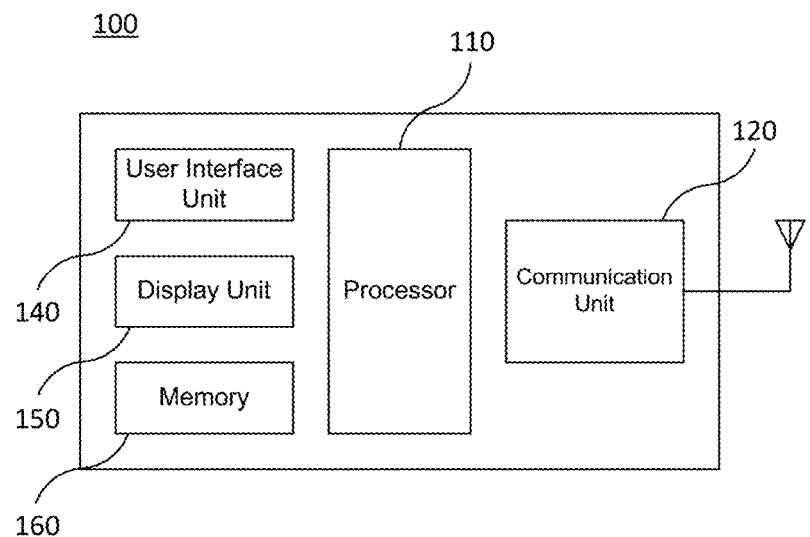
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, and 60 GHz. According to an embodiment, the station 100 may include a communication module using a frequency band of 6 GHz or more and a communication module using a frequency band of 6 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
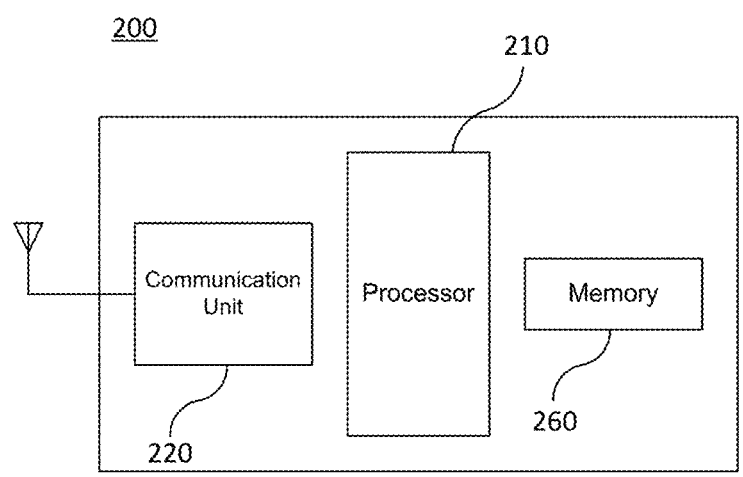
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, and 60 GHz together. Preferably, the AP 200 may include a communication module using a frequency band of 6 GHz or more and a communication module using a frequency band of 6 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
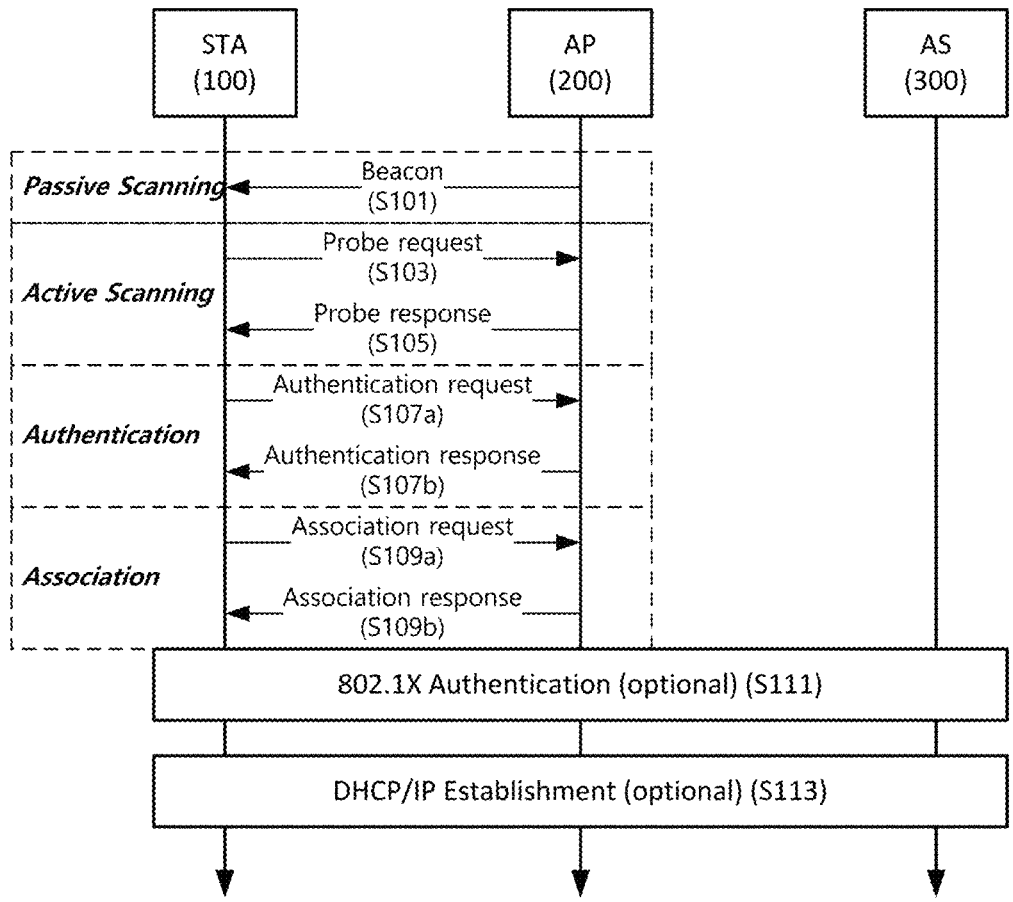
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
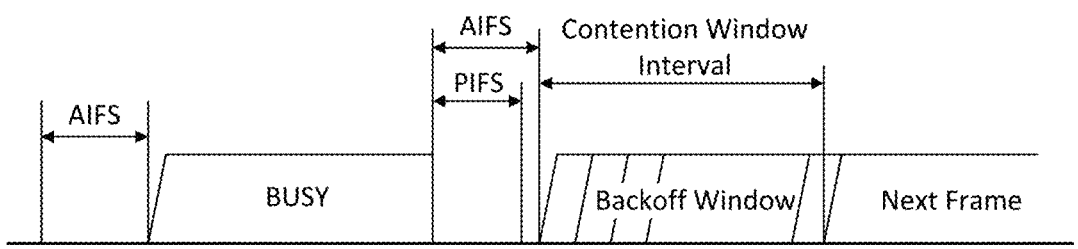
FIG. 6 illustrates a carrier sense multiple access (CSMA)/collision avoidance (CA) method used in wireless LAN communication.

FIG. 6 illustrates a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number, that is, a backoff counter determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers (i.e. backoff counters), respectively to perform the backoff procedure again. According to an embodiment, a random number newly assigned to each terminal may be decided within a range (2*CW) which is twice larger than a range (a contention window, CW) of a random number which the corresponding terminal has previously used. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Multi-User Transmission

When using orthogonal frequency division multiple access (OFDMA) or multi-input multi-output (MIMO), a wireless communication terminal can simultaneously transmit data to a plurality of wireless communication terminals. Further, a plurality of wireless communication terminals can simultaneously transmit data to a wireless communication terminal. For example, a downlink multi-user (DL-MU) transmission in which an AP simultaneously transmits data to a plurality of STAs, and an uplink multi-user (UL-MU) transmission in which a plurality of STAs simultaneously transmit data to the AP may be performed.

In order to perform the UL-MU transmission, a resource unit to be used by each STA and the transmission start time of each STA that performs uplink transmission should be determined. According to an embodiment of the present invention, the UL-MU transmission process may be managed by the AP. The UL-MU transmission may be performed in response to a trigger frame transmitted by the AP. The trigger frame indicates a UL-MU transmission a SIFS time after the PHY protocol data unit (PPDU) carrying the trigger frame. Further, the trigger frame delivers resource unit allocation information for the UL-MU transmission. When the AP transmits a trigger frame, a plurality of STAs transmit uplink data through each allocated resource unit at the time specified by the trigger frame. A UL-MU transmission in response to the trigger frame is performed by a trigger-based PPDU. After the uplink data transmission is completed, the AP transmits an ACK to STAs that have successfully transmitted uplink data. In this case, the AP may transmit a predetermined multi-STA block ACK (M-BA) as an ACK for a plurality of STAs.

In the non-legacy wireless LAN system, a specific number, for example, 26, 52, or 106 tones may be used as a resource unit for a subchannel-based access in a channel of 20 MHz band. Accordingly, the trigger frame may indicate identification information of each STA participating in the UL-MU transmission and information of the allocated resource unit. The identification information of the STA includes at least one of an association ID (AID), a partial AID, and a MAC address of the STA. Further, the information of the resource unit includes the size and placement information of the resource unit.

Figure 7:
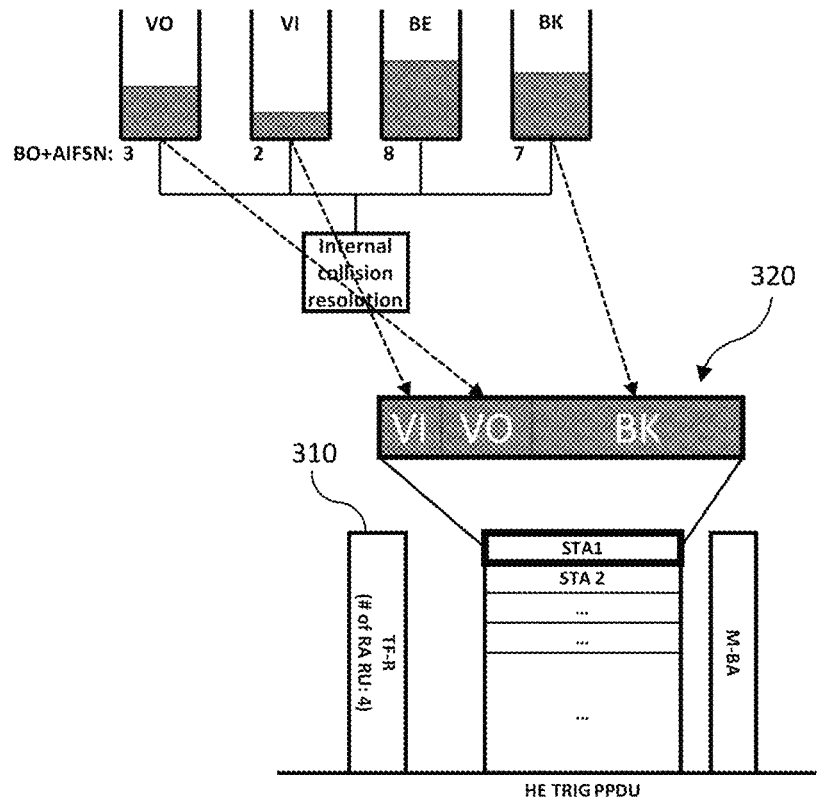
FIG. 7 illustrates an embodiment of an operation of an uplink transmission terminal in an uplink multi-user transmission process.

FIG. 7 illustrates an embodiment of an operation of an uplink transmission terminal in an uplink multi-user transmission process. As described above, resource units are allocated to the STAs participating in the UL-MU transmission through the trigger frame 310, and the STAs receive MAC protocol data unit (MPDU) or aggregate MPDU (A-MPDU) through the allocated resource unit. In this case, the STA transmits (A-)MPDU 320 by configuring it according to the transmission length specified in the trigger frame 310.

The STA participating in the UL-MU transmission may configure the (A-)MPDU 320 based on information of enhanced distributed channel access (EDCA) buffer of the corresponding terminal at the time of receiving the trigger frame 310. More specifically, the STA determines priority among the access categories at the channel access time of the UL-MU transmission, taking into account a backoff counter and an AIFSN value remaining for each access category in the EDCA buffer. The (A-)MPDU 320 to be transmitted by the STA may first be configured with data of an access category of the determined highest priority. Next, the (A-)MPDU 320 may be configured to include data of the next priority access category within the allowed transmission length of the STA. Referring to FIG. 7, the priority among the access categories in the EDCA buffer of STA1 participating in the UL-MU transmission are determined in the order of video (VI), voice (VO), background (BK) and best effort (BE). Thus, STA1 configures the (A-)MPDU 320 with data of the highest priority, that is, VI access category. In addition, STA1 may fill the remaining length within the allowed transmission length of the (A-)MPDU 320 with data of VO and BK categories which are the next priorities.

According to an embodiment of the present invention, the STA has transmitted a buffer status report (BSR) to the AP before the trigger frame 310 is transmitted, and the STA may configure the (A-)MPDU with the corresponding traffic as the highest priority if the target traffic of the BSR remains in the EDCA buffer. If an allowed transmission length of the STA remains, the STA may configure the remaining portion of the (A-)MPDU based on the priority among the above-described access categories.

Figure 8:
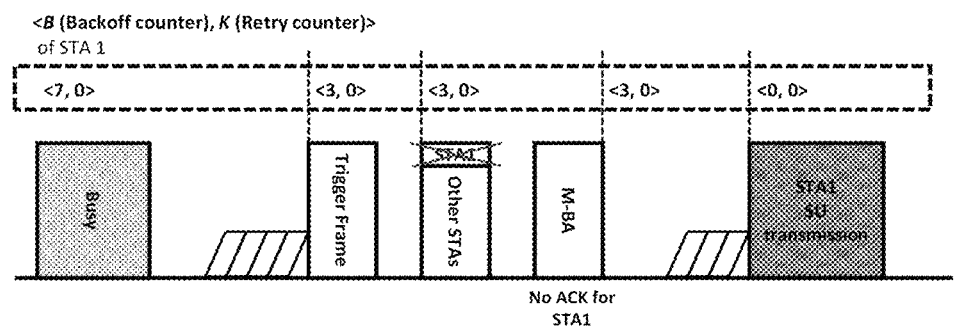
FIG. 8 illustrates an embodiment of a subsequent operation of the uplink transmission terminal when the uplink multi-user transmission has failed.

FIG. 8 illustrates an embodiment of a subsequent operation of the uplink transmission terminal when the uplink multi-user transmission has failed. In the contention-based channel access procedure, each terminal uses and manages a backoff counter as in the embodiment of FIG. 6 for a single-user transmission. However, when participating in the trigger-based UL-MU transmission, the STA may perform an UL-MU transmission irrespective of the backoff counter managed by the corresponding STA. If the STA succeeds in the UL-MU transmission, the STA may initialize the backoff counter and the retry counter. If subsequent data is present in the queue of the same access category, the STA may participate in a channel contention by allocating a new backoff counter for the subsequent data.

However, if the UL-MU transmission of the STA has failed, the STA may resume the transmission process of the data. According to the embodiment of the present invention, when a response corresponding to the trigger-based PPDU transmitted by the STA is not received, it can be determined that the UL-MU transmission of the STA has failed. The STA may transmit data that has failed to be transmitted in the UL-MU transmission process through the subsequent UL-MU transmission process or a single-user transmission process of the corresponding STA. According to the embodiment of FIG. 8, when the data that has failed to be transmitted in the UL-MU transmission process is transmitted through a single-user transmission process of the corresponding STA, the STA performs a channel access using an existing backoff counter for a single-user transmission. The existing backoff counter for a single-user transmission is a backoff counter maintained by the STA before the corresponding UL-MU transmission process. That is, if the UL-MU transmission has failed, the STA may attempt to access the channel by reusing the backoff counter which was maintained for a single-user transmission.

More specifically, FIG. 8 shows a process in which STA1, which has failed in the UL-MU transmission, retries the data transmission through a single-user transmission. In the embodiments of FIG. 8 and the following figures, x and y of <x, y> represent the remaining backoff counter and the retry counter of the corresponding terminal. Before receiving the trigger frame for the UL-MU transmission procedure, the remaining backoff counter of STA1 was 3. STA1 transmits a trigger-based PPDU in the UL-MU transmission process, but does not receive the corresponding response. Therefore, STA1 may retry the transmission of the corresponding data through a single-user transmission process. In this case, STA1 may attempt to access the channel for a single-user transmission by using the remaining backoff counter 3. If the backoff counter expires in a subsequent backoff procedure, STA1 may perform the single-user transmission.

Figure 9:
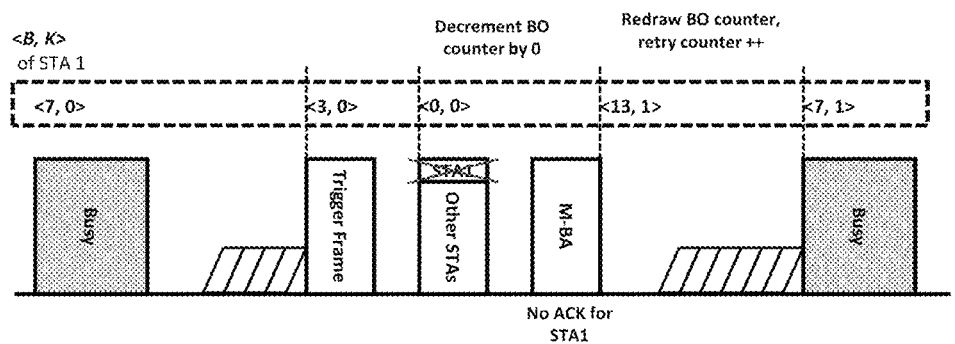
FIG. 9 illustrates another embodiment of a subsequent operation of the uplink transmission terminal when the uplink multi-user transmission has failed.

FIG. 9 illustrates another embodiment of a subsequent operation of the uplink transmission terminal when the uplink multi-user transmission has failed. If the STA which has failed in the UL-MU transmission retries the data transmission using the existing backoff counter for a single-user transmission as in the embodiment of FIG. 8, the STA may have two or more transmission opportunities through one contention for the same data. In this case, the fairness of the channel access between a STA participating in the UL-MU transmission and a STA not participating in the UL-MU transmission is lost.

Therefore, according to another embodiment of the present invention, a STA which has failed in a UL-MU transmission regards that a single-user transmission has failed and performs the subsequent channel access procedure. For this purpose, the STA participating in the UL-MU transmission may decrement the backoff counter maintained by the corresponding STA to 0. If the UL-MU transmission has failed, the STA increments the retry counter for the corresponding access category by 1 and obtains a new backoff counter within a range of a contention window based on the incremented retry counter. Upon the increment of the retry counter, the contention window of the STA may change from the first contention window to the second contention window. If the size of the first contention window is not the maximum size of the contention window, the size of the second contention window may be twice the size of the first contention window plus 1. The STA obtains a new backoff counter within the second contention window and performs channel access using the obtained new backoff counter.

Referring to FIG. 9, the size of the first contention window of STA1 is 15, and channel access is performed using a backoff counter 7 obtained within the first contention window. In the first backoff procedure, the backoff counter of STA1 is decremented to 3, and an UL-MU transmission process by the trigger frame is started. STA1 participating in the UL-MU transmission process may decrement the backoff counter to 0 and attempt transmission of the trigger-based PPDU. However, the UL-MU transmission of STA1 has failed, and STA1 retries transmission of the corresponding data through a single-user transmission. STA1 increments the retry counter for the corresponding access category by 1 and obtains a new backoff counter 13 within the size 32 of the second contention window based on the incremented retry counter. STA1 performs channel access using the obtained new backoff counter 13.

On the other hand, when carrier sensing is required before transmission of the trigger-based PPDU, the channel may be determined to be busy as a result of the carrier sensing so that the STA may not transmit the trigger-based PPDU. According to a further embodiment of the present invention, if the channel is determined to be busy as a result of the carrier sensing so that the trigger-based PPDU is not transmitted, the UL-MU transmission of the STA may not be regarded as failed. Thus, the STA may not increment the retry counter for a single-user transmission.

Figure 10:
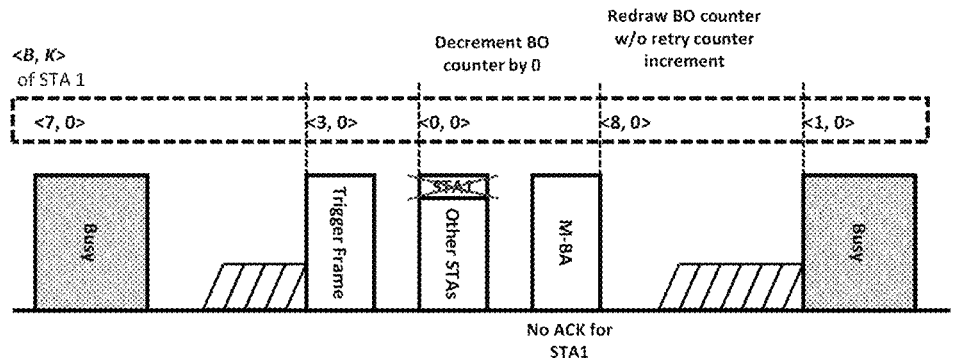
FIG. 10 illustrates yet another embodiment of a subsequent operation of the uplink transmission terminal when the uplink multi-user transmission has failed.

FIG. 10 illustrates yet another embodiment of a subsequent operation of the uplink transmission terminal when the uplink multi-user transmission has failed. When participating in the UL-MU transmission corresponding to the trigger frame received from the AP, the STA should attempt to transmit data at an unintended point in time. Therefore, according to another yet embodiment of the present invention, it is possible to reduce the penalty due to the UL-MU transmission failure. More specifically, if the UL-MU transmission has failed, the STA obtains a new backoff counter within the existing contention window range without incrementing the retry counter. The STA performs channel access using the obtained new backoff counter.

Referring to FIG. 10, the size of the initial contention window of STA1 is 15, and channel access is performed using a backoff counter 7 obtained within the initial contention window. In the first backoff procedure, the backoff counter of STA1 is decremented to 3, and an UL-MU transmission process by the trigger frame is started. STA1 participating in the UL-MU transmission process may decrement the backoff counter to 0 and attempt transmission of the trigger-based PPDU. However, the UL-MU transmission of STA1 has failed, and STA1 retries transmission of the corresponding data through a single-user transmission. STA1 obtains a new backoff counter 8 within the size 15 of the existing contention window. STA1 performs channel access using the obtained new backoff counter 8.

Uplink Multi-User Random Access

In the non-legacy wireless LAN system, UL-MU random access can be performed. In an embodiment of the present invention, the UL-MU random access may be performed through UL OFDMA-based random access. However, the present invention is not limited thereto. When the trigger frame transmitted by the AP indicates resource unit(s) allocated for random access, STAs may perform random access via the corresponding resource unit(s). A resource unit for random access (i.e., a random resource unit) may be identified through a predetermined AID value. If an AID subfield of a user information field in the trigger frame indicates the predetermined AID value, the corresponding resource unit may be identified as a random resource unit. STAs may select at least one of the random resource unit(s) indicated through the trigger frame and attempt the UL-MU transmission via the selected random resource unit.

STAs attempting UL OFDMA-based random access perform contention to obtain transmission opportunity. A separate OFDMA backoff (OBO) counter is used for contention in the UL OFDMA-based random access. The OBO counter is obtained within a range of an OFDMA contention window (OCW) managed for each STA. The AP transmits a minimum value of OCW (i.e., OCWmin) and a maximum value of OCW (i.e., OCWmax) for OCW determination of each STA through a random access parameter set. The random access parameter set may be transmitted by being contained in at least one of a beacon, a probe response, a (re) association response, and an authentication response. A STA that initially attempts the UL OFDMA-based random access sets the OCW of the corresponding STA to 'OCWmin-1' based on the received random access parameter set. Next, the STA selects an arbitrary integer within the range from 0 to OCW to obtain the OBO counter. In an embodiment of the present invention, the OBO counter and the OCW may represent a backoff counter for the UL-MU random access and a contention window for the UL-MU random access, respectively.

STAs decrement their OBO counter by the number of resource unit(s) on which random access can be performed each time a trigger frame is transmitted. That is, when N resource units(s) are allocated to the random access, the STAs may decrement the OBO counter by a maximum of N in the random access contention of the UL-MU transmission process by the corresponding trigger frame. According to an embodiment of the present invention, the STA may decrement the OBO counter if the STA has pending data to be transmitted to the AP. If the OBO counter of the STA is less than or equal to the number of resource units(s) on which random access can be performed, the OBO counter of the STA is decremented to zero. If the OBO counter is zero or decremented to zero, the STA may randomly select at least one of resource units(s) allocated for random access and perform an UL-MU transmission via the selected resource unit. A STA that has failed to decrement the OBO counter to 0 in the corresponding contention process may attempt random access by repeating the above-described OBO counter decrementing process when the next trigger frame is transmitted.

Figure 11:
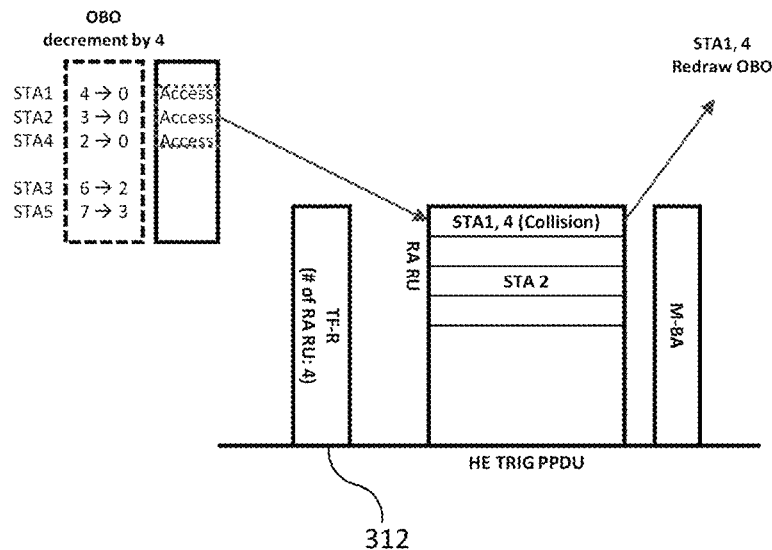
FIG. 11 illustrates an embodiment of a UL OFDMA-based random access procedure.

FIG. 11 illustrates an embodiment of a UL OFDMA-based random access procedure. Each STA uses the OBO counter to contend for UL OFDMA-based random access. In the embodiment of FIG. 11, a trigger frame 312 indicates four random resource units. STAs receiving the trigger frame 312 decrements an OBO counter of the corresponding STA based on the number 4 of the random resource units. In this case, OBO counters of STA1, STA2 and STA4 having an OBO counter less than or equal to the number 4 of the random resource units are decremented to 0. Thus, STA1, STA2 and STA4 can select one of the random resource units assigned by the trigger frame 312 to transmit a trigger-based PPDU.

In the embodiment of FIG. 11, STA1 and STA4 select the same random resource unit to transmit the trigger-based PPDU, which causes a collision. Therefore, STA1 and STA4 do not receive a response corresponding to the transmitted trigger-based PPDU. If the UL OFDMA-based random access has failed, the STA increments the OCW by a predetermined ratio and randomly obtains a new OBO counter within the incremented OCW range. Upon the increment of the OCW, the OCW of the STA may change from the first OCW to the second OCW. If the size of the first OCW is not the maximum value of OCW, the size of the second OCW may be twice the size of the first OCW plus 1. However, if the size of the existing OCW of the STA is equal to the maximum value of OCW, the STA does not increment the OCW even if the random access has failed. That is, if the size of the first OCW is equal to the maximum value of OCW, the second OCW may be set equal to the first OCW. In the embodiment of FIG. 11, STA1 and STA4 may randomly obtain a new OBO counter within the incremented second OCW, respectively, and participate in the subsequent UL OFDMA-based random access procedure using the obtained new OBO counter.

FIGS. 12 to 15 illustrate embodiments of a UL OFDMA-based random access procedure when a carrier sensing is required before the transmission of a trigger-based PPDU. In the embodiment of each drawing, duplicative descriptions of parts which are the same or corresponding to the embodiments of the previous drawings will be omitted.

Figure 12:
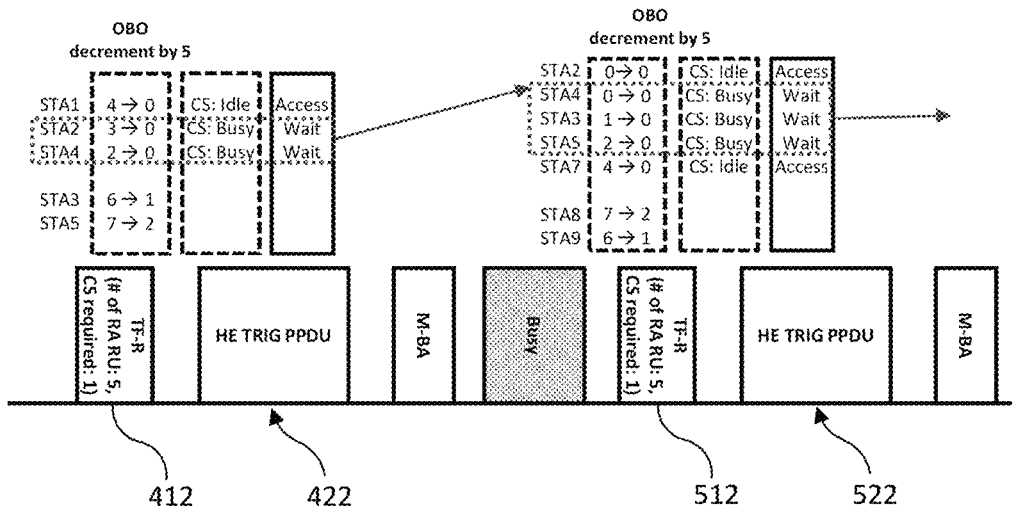
FIGS. 12 to 15 illustrate embodiments of a UL OFDMA-based random access procedure when a carrier sensing is required before the transmission of a trigger-based PPDU.

FIG. 12 illustrates the first embodiment of a UL OFDMA-based random access procedure when a carrier sensing is required before the transmission of a trigger-based PPDU. When a carrier sensing is required before the transmission of the trigger-based PPDU 422, 522, STAs should perform carrier sensing on the channel to be accessed. Trigger frames 412 and 512 may indicate through a separate 'CS required' field whether or not carrier sensing is required before the transmission of trigger-based PPDUs 422 and 522. In this case, the carrier sensing may be performed during a SIFS time between the trigger frames 412, 512 and the trigger-based PPDUs 422, 522 transmitted in response thereto.

As described above, STAs whose OBO counter is 0 or decremented to 0 can select one of the random resource units to attempt random access. In this case, the STA performs carrier sensing of the channel containing the selected resource unit. If the channel containing the selected resource unit is determined to be idle as a result of the carrier sensing, the STA may transmit a trigger-based PPDU through the selected resource unit. However, if the channel containing the selected resource unit is determined to be busy as a result of the carrier sensing, the STA cannot transmit the trigger-based PPDU through the selected resource unit. If the trigger-based PPDU is not transmitted since the channel is determined to be busy as a result of the carrier sensing, the OCW and the OBO counter for the STA to participate in the subsequent UL OFDMA-based random access procedure should be determined.

According to the first embodiment of the present invention, when the trigger-based PPDU is not transmitted since the channel is determined to be busy as a result of the carrier sensing, the STA may participate in the subsequent UL OFDMA-based random access procedure while maintaining the OBO counter at that point of time. That is, the STA maintains the OBO counter as 0 to participate in the subsequent UL OFDMA-based random access procedure. If a carrier sensing is also required before the transmission of the trigger-based PPDU in the subsequent UL OFDMA-based random access procedure, the STA may transmit the trigger-based PPDU when the channel containing the selected resource unit is determined to be idle.

Referring to FIG. 12, the first trigger frame 412 indicates 5 random resource units and set the 'CS required' field to 1 to require carrier sensing before the transmission of a trigger-based PPDU. STAs receiving the first trigger frame 412 decrements an OBO counter of the corresponding STA based on the number 5 of random resource units. In this case, OBO counters of STA1, STA2 and STA4 having an OBO counter less than or equal to the number 5 of random resource units are decremented to 0. STA1, STA2 and STA4 perform carrier sensing for channel access. The channel sensed by STA1 is determined to be idle, but the channels sensed by STA2 and STA4 are determined to be busy. Thus, STA1 transmits a trigger-based PPDU 422 in response to the first trigger frame 412, but STA2 and STA4 do not perform random access. In this case, STA2 and STA4 may suspend the random access and participate in the subsequent UL OFDMA-based random access procedure while maintaining the OBO counter 0.

In the embodiment of FIG. 12, the second trigger frame 512 indicates 5 random resource units and sets the 'CS required' field to 1 to require carrier sensing before the transmission of the trigger-based PPDU. STAs receiving the second trigger frame 512 decrements an OBO counter of the corresponding STA based on the number 5 of the random resource units. In this case, OBO counters of STA3, STA5 and STA7 having an OBO counter less than or equal to the number 5 of random resource units are decremented to 0. Further, in the previous UL OFDMA-based random access procedure, the OBO counters of STA2 and STA4 in which the random access is suspended are 0. Thus, STA2, STA4, STA3, STA5 and STA7 perform carrier sensing for channel access. The channels sensed by STA2 and STA7 are determined to be idle, but the channels sensed by STA4, STA3 and STA5 are determined to be busy. Thus, STA2 and STA7 transmit a trigger-based PPDU 522 in response to the second trigger frame 512, but STA4, STA3 and STA5 do not perform random access.

Figure 13:
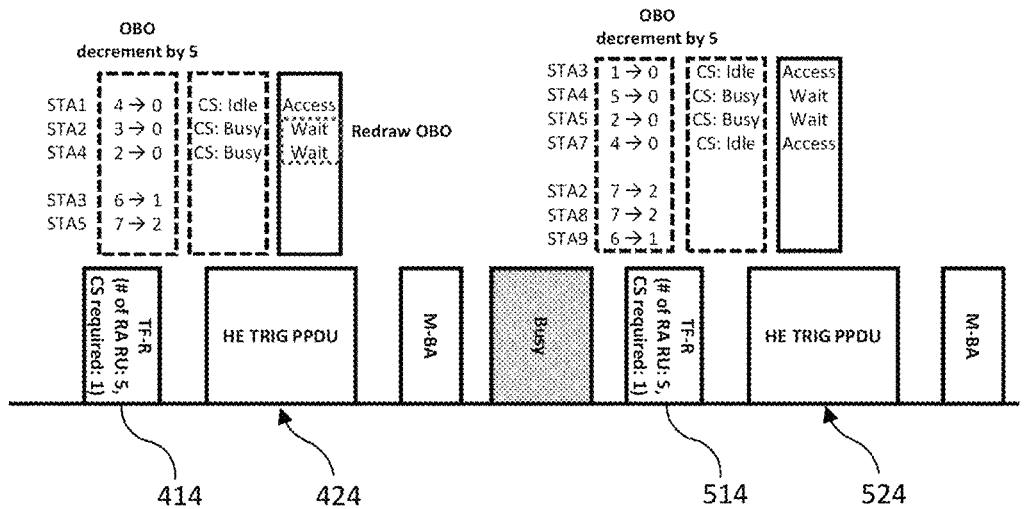

FIG. 13 illustrates the second embodiment of a UL OFDMA-based random access procedure when a carrier sensing is required before the transmission of a trigger-based PPDU. In a consecutive UL OFDMA-based random access procedure, when STAs having an OBO counter of 0 are stacked, the probability of collision of random access STAs in the limited resource unit is increased. Therefore, according to the second embodiment of the present invention, when the trigger-based PPDU is not transmitted since the channel is determined to be busy as a result of the carrier sensing, the STA obtains a new OBO counter to participate in the subsequent UL OFDMA-based random access procedure. More specifically, the STA randomly obtains a new OBO counter within the existing OCW and participates in the subsequent UL OFDMA-based random access procedure using the obtained new OBO counter. If the STA does not access the channel due to the carrier sensing result, it cannot be regarded as a transmission failure and does not affect the channel for random access. Therefore, the OCW for obtaining the new OBO counter may have the same size as the existing OCW.

Referring to FIG. 13, the first trigger frame 414 indicates 5 random resource units and sets the 'CS required' field to 1 to require carrier sensing before the transmission of a trigger-based PPDU. As in the embodiment of FIG. 12, among the STAs that have received the first trigger frame 414, STA1, STA2, and STA4 whose OBO counters are decremented to 0 perform carrier sensing for channel access. The channel sensed by STA1 is determined to be idle, but the channels sensed by STA2 and STA4 are determined to be busy. Thus, STA1 transmits a trigger-based PPDU 424 in response to the first trigger frame 414, but STA2 and STA4 do not perform random access. STA2 and STA4 may suspend random access and obtain a new OBO counter to participate in the subsequent UL OFDMA-based random access procedure. In this case, new OBO counters of STA2 and STA4 may be obtained within the existing OCW of the corresponding STA, respectively. In the embodiment of FIG. 13, STA2 obtains a new OBO counter 7 and STA4 obtains a new OBO counter 5.

In the embodiment of FIG. 13, the second trigger frame 514 indicates 5 random resource units and sets the 'CS required' field to 1 to require carrier sensing before the transmission of the trigger-based PPDU. Among the STAs that have received the second trigger frame 514, STA3, STA4, STA5 and STA7 whose OBO counters are decremented to 0 perform carrier sensing for channel access. The channels sensed by STA3 and STA7 are determined to be idle, but the channels sensed by STA4 and STA5 are determined to be busy. Thus, STA3 and STA7 transmit a trigger-based PPDU 524 in response to the second trigger frame 514, but STA4 and STA5 do not perform random access. Meanwhile, the new OBO counter 7 obtained by STA2 is larger than the number 5 of the random resource units indicated by the second trigger frame 514. Therefore, STA2 does not transmit the trigger-based PPDU and may participate in the subsequent UL OFDMA-based random access procedure using the remaining backoff counter 2.

Figure 14:
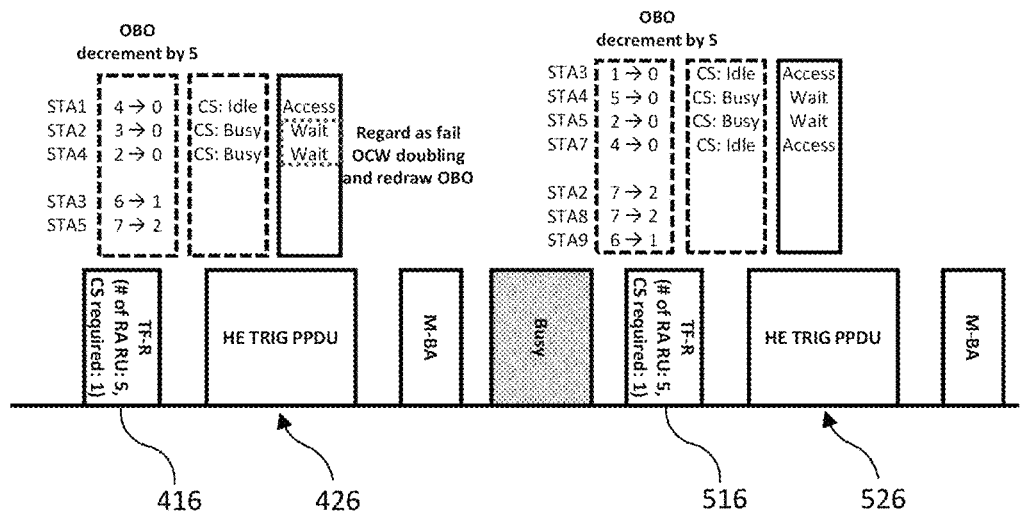

FIG. 14 illustrates the third embodiment of a UL OFDMA-based random access procedure when a carrier sensing is required before the transmission of a trigger-based PPDU. As described above, in the consecutive UL OFDMA-based random access procedure, when STAs having an OBO counter of 0 are stacked, the probability of collision of random access STAs in the limited resource unit is increased. According to the third embodiment of the present invention, when the trigger-based PPDU is not transmitted since the channel is determined to be busy as a result of the carrier sensing, the UL OFDMA-based random access may be regarded as failed. Thus, the STA increments the OCW by a predetermined ratio and randomly obtains a new OBO counter within the incremented OCW range. As in the above-described embodiment, the size of the incremented OCW may be twice the size of the existing OCW plus 1. The STA randomly obtains the new OBO counter within the incremented OCW range and participates in the subsequent UL OFDMA-based random access procedure.

Referring to FIG. 14, the transmission process of the first trigger frame 416 and the corresponding trigger-based PPDU 426 is as described in the embodiments of FIGS. 12 and 13. STA2 and STA4, in which the channel is determined to be busy as a result of the carrier sensing, do not perform random access. STA2 and STA4 may suspend random access and obtain a new OBO counter to participate in the subsequent UL OFDMA-based random access procedure. In this case, new OBO counters of STA2 and STA4 may be obtained within the incremented OCW of the corresponding STA, respectively. In the embodiment of FIG. 14, STA2 obtains a new OBO counter 7 and STA4 obtains a new OBO counter 5. After STA2 and STA4 respectively obtain a new OBO counter, the transmission process of the second trigger frame 516 and the corresponding trigger-based PPDU 526 is as described in the embodiment of FIG. 13.

Figure 15:
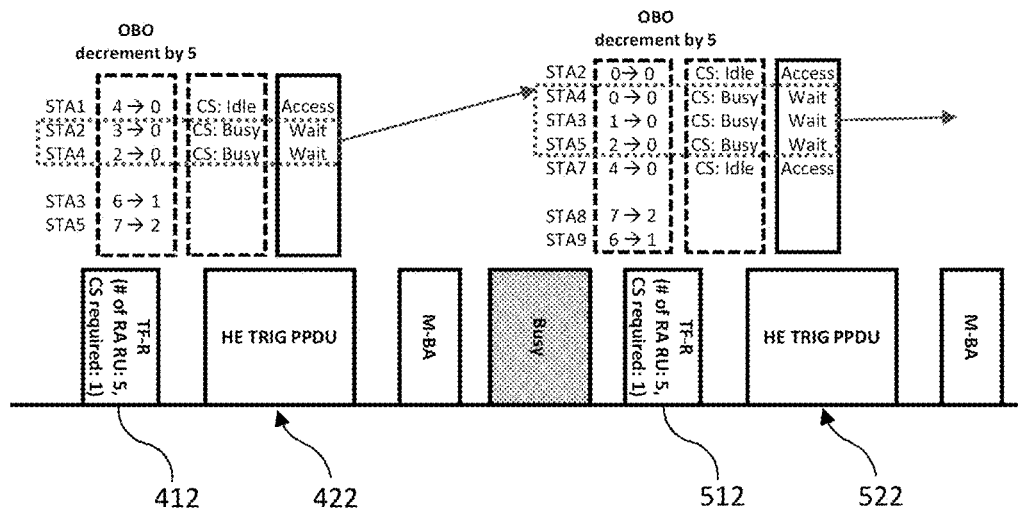

FIG. 15 illustrates the fourth embodiment of a UL OFDMA-based random access procedure when a carrier sensing is required before the transmission of a trigger-based PPDU. According to the fourth embodiment of the present invention, when a carrier sensing is required before the transmission of the trigger-based PPDU, the STA may determine whether to decrement the OBO counter according to a result of the carrier sensing. When the channel containing the selected resource unit is determined to be idle as a result of the carrier sensing, the STA may perform the OBO counter decrement process described above. However, when the channel containing the selected resource unit is determined to be busy as a result of the carrier sensing, the STA may participate in the subsequent UL OFDMA-based random access procedure while maintaining the OBO counter without decrementing the OBO counter. Thus, it is possible to prevent STAs having an OBO counter of 0 being stacked in the consecutive UL OFDMA-based random access procedure.

Referring to FIG. 15, the first trigger frame 418 indicates 5 random resource units and sets the 'CS required' field to 1 to require carrier sensing before the transmission of a trigger-based PPDU. STAs receiving the first trigger frame 418 perform carrier sensing before the transmission of the trigger-based PPDU. The channels sensed by STA1, STA4 and STA5 are determined to be idle, but the channels sensed by STA2 and STA3 are determined to be busy. Thus, STA1, STA4 and STA5 decrement an OBO counter in response to the first trigger frame 418, but STA2 and STA3 do not decrement an OBO counter. In this case, STA2 and STA3 may suspend the random access and participate in the subsequent UL OFDMA-based random access procedure while maintaining the corresponding OBO counter. Similarly, STAs receiving the second trigger frame 518 perform carrier sensing before the transmission of the trigger-based PPDU. STA3 and STA5, which have determined that the channel on which the carrier sensing is performed is busy, do not decrement an OBO counter in response to the second trigger frame 518.

The AP may allocate multiple channels for random access. According to an embodiment of the present invention, the STAs may perform the carrier sensing on all channels to determine whether to decrement the OBO counter. However, according to another embodiment of the present invention, the STAs may perform the carrier sensing for each allocated 20 MHz channel. In this case, the STAs may attempt random access only to the random resource units contained in the channel determined to be idle. According to an embodiment of the present invention, the STA may decrement the OBO counter based on the number of random resource unit(s) contained in the channel determined to be idle.

Figure 16:
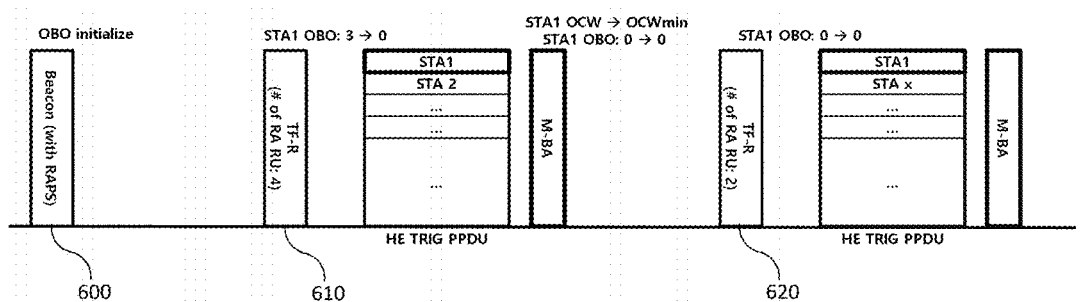
FIGS. 16 to 18 illustrate embodiments of an OBO counter management method of a STA that has succeeded in a UL OFDMA-based random access.
Figure 17:
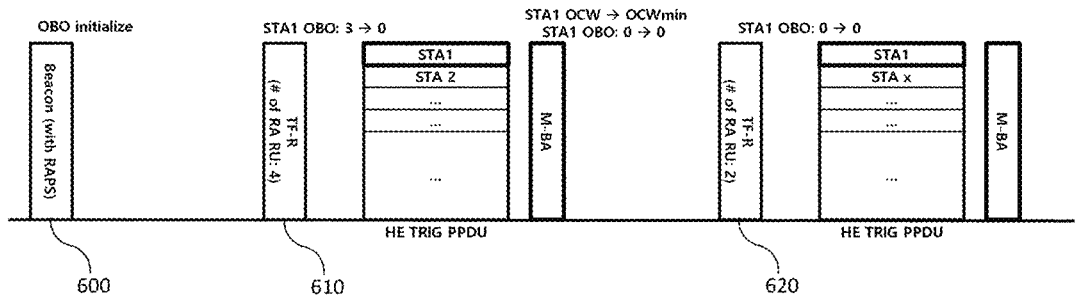
Figure 18:
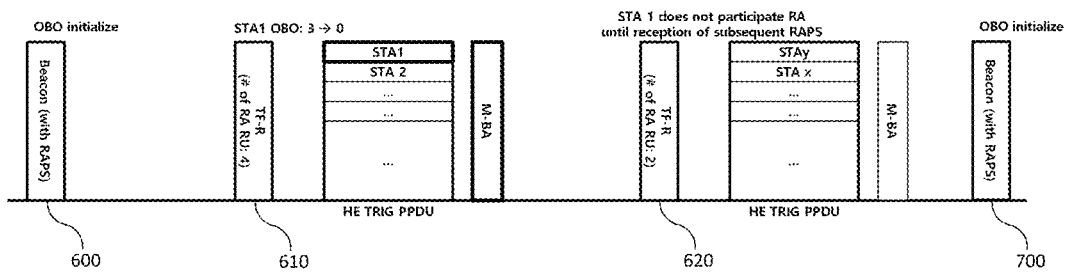

FIGS. 16 to 18 illustrate embodiments of an OBO counter management method of a STA that has succeeded in a UL OFDMA-based random access.

As described above, the AP may transmit a random access parameter set to the STAs through a beacon 600 or the like. The random access parameter set includes the minimum value of OCW and the maximum value of OCW for determining OCW of each STA, or information that can be used to derive these values. STAs attempting UL OFDMA-based random access determine an OCW between the minimum value of OCW and the maximum value of OCW, and randomly select an OBO counter within the OCW range. If the trigger frame 610, 620 transmitted by the AP indicates at least one random resource unit (or if one or more user information fields having a predetermined AID value indicating random access are present), STAs may attempt random access through at least one of the indicated random resource unit(s).

If the UL OFDMA-based random access has failed, the STA increments the OCW and randomly obtains a new OBO counter within the incremented OCW range. As in the above-described embodiments, the size of the incremented OCW may be twice the size of the existing OCW plus 1. The STA randomly obtains a new OBO counter within the incremented OCW range to participate in the subsequent UL OFDMA-based random access procedure. On the other hand, if the UL OFDMA-based random access is successful, the STA resets the OCW to the minimum value of OCW. In this case, a rule for obtaining a new OBO counter is required by the STA that has succeeded in the UL OFDMA-based random access.

First, according to the embodiment of FIG. 16, the STA succeeding the UL OFDMA-based random access may participate in the subsequent UL OFDMA-based random access procedure while maintaining the existing OBO counter. That is, the STA maintains the OBO counter as 0 to participate in the subsequent UL OFDMA-based random access procedure. Referring to FIG. 16, the first trigger frame 610 indicates 4 random resource units, and the second trigger frame 620 indicates 2 random resource units. The OBO counter of STA1 receiving the first trigger frame 610 is decremented to 0, and STA1 succeeds in transmitting a trigger-based PPDU. STA1 that has succeeded in the UL OFDMA-based random access resets the OCW to the minimum value of OCW and maintains the OBO counter as 0. Upon receiving the second trigger frame 620, since the OBO counter of STA1 is 0, STA1 can transmit a trigger-based PPDU again. Thus, if the OBO counter is maintained as 0, the STA will continue to have random access opportunities until the UL OFDMA-based random access fails.

FIG. 17 illustrates another embodiment of the present invention. A STA that has succeeded in the UL OFDMA-based random access may obtain a new OBO counter based on the reset OCW. In this case, the size of the reset OCW may be equal to the minimum value of OCW. The STA participates in the subsequent UL OFDMA-based random access procedure using the new OBO counter. Referring to FIG. 17, the OBO counter of STA1 receiving the first trigger frame 610 is decremented to 0, and STA1 succeeds in transmitting a trigger-based PPDU. STA1 that has succeeded in the UL OFDMA-based random access resets the OCW to the minimum value of OCW and obtains a new OBO counter 5 within the reset OCW. STA1 participates in the subsequent UL OFDMA-based random access procedure using the new OBO counter 5. The OBO counter of STA1 is decremented to 3 when receiving the second trigger frame 620, STA1 does not perform the random access since the OBO counter is not decremented to 0. STA1 participates in the subsequent UL OFDMA-based random access procedure using the remaining OBO counter 3.

FIG. 18 illustrates yet another embodiment of the present invention. A STA that has succeeded in the UL OFDMA-based random access may not participate in the random access until it receives a new random access parameter set. In the embodiment of FIG. 18, STA1 that has succeeded in the random access in response to the first trigger frame 610 does not perform additional UL OFDMA-based random access until the next beacon 700 containing the random access parameter set is received. Therefore, STA1 does not perform a separate random access when the second trigger frame 620 is received. According to an embodiment, STA1 may not reset the OCW and OBO counter until it receives a new random access parameter set.

Figure 19:
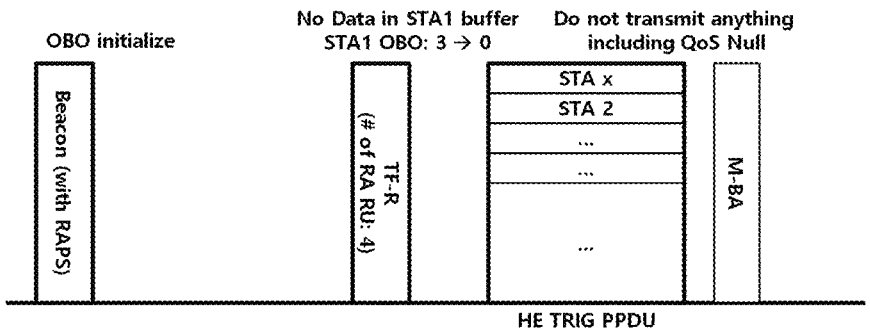
FIGS. 19 and 20 illustrate embodiments of a UL OFDMA-based random access procedure when a STA does not have pending data to be transmitted.

FIG. 19 illustrates an embodiment of a UL OFDMA-based random access procedure when a STA does not have pending data to be transmitted. A STA indicated to transmit a trigger-based PPDU may not transmit data or transmit one or more QoS Null frames if the STA has no pending uplink data. However, if the STA which has no pending uplink data transmits a QoS Null frame in the random access procedure, the probability of collision in the random resource unit is increased. Therefore, according to the embodiment of the present invention, the STA may participate in the UL OFDMA-based random access procedure only when the STA has pending data to be transmitted to the AP. A STA which has no pending data to be transmitted do not transmit any data, including QoS Null frames, through random access.

Figure 20:
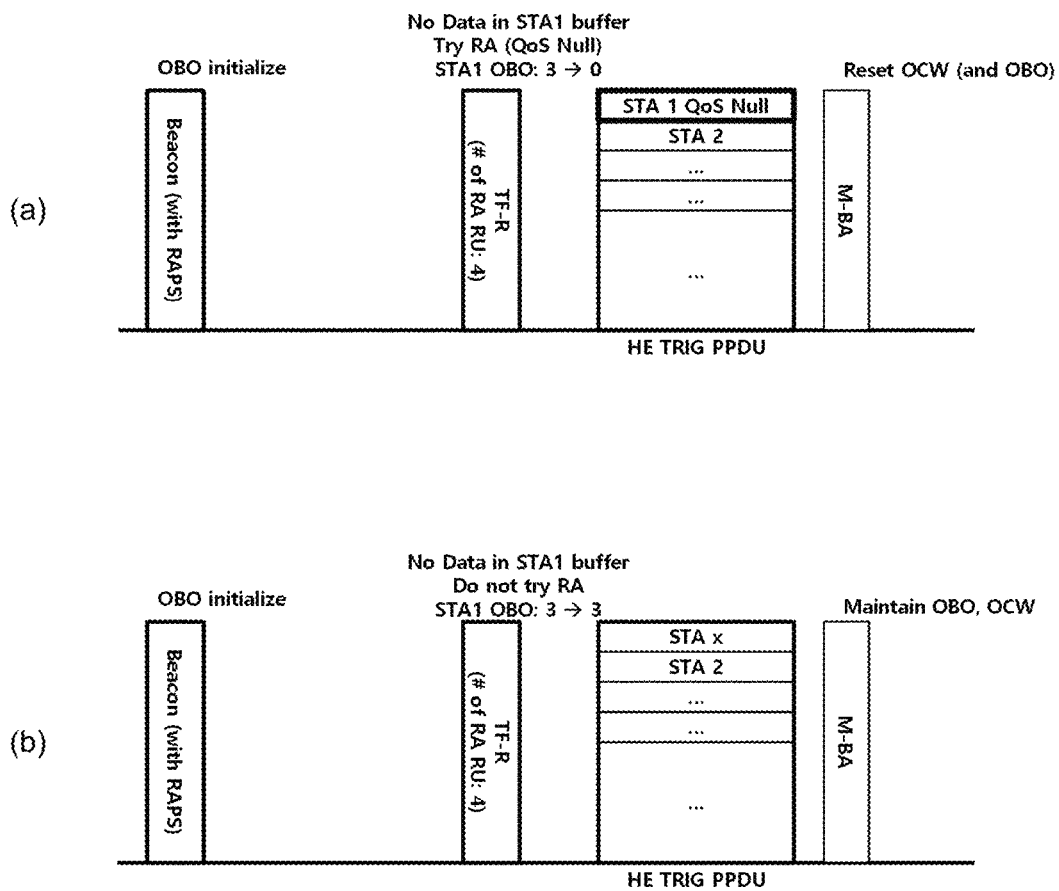

FIG. 20 illustrates another embodiment of a UL OFDMA-based random access procedure when a STA does not have pending data to be transmitted. According to another embodiment of the present invention, when a STA with no data to be transmitted in the EDCA buffer receives a trigger frame indicating the random resource unit, whether to attempt the random access may be determined according to the selection of the STA.

As shown in FIG. 20(a), STA1 participating in the random access to transmit information such as the buffer status report may perform the above-described OBO counter decrement process. When the OBO counter is decremented to 0, STA1 may arbitrarily select at least one of the random resource unit(s) to transmit a QoS Null frame. STA1 that has succeeded in the UL OFDMA-based random access may reset an OCW and obtain a new OBO counter.

However, as shown in FIG. 20(b), when STA1 does not even transmit a QoS null frame, STA1 does not perform the OBO counter decrement process. That is, according to an embodiment of the present invention, the STA may decrement the OBO counter only if it has pending data to be transmitted to the AP. Since STA1 does not participate in random access, it does not reset an OCW after the corresponding random access procedure. That is, STA1 participates in the subsequent UL OFDMA-based random access procedure using existing OCW and OBO counter.

Figure 21:
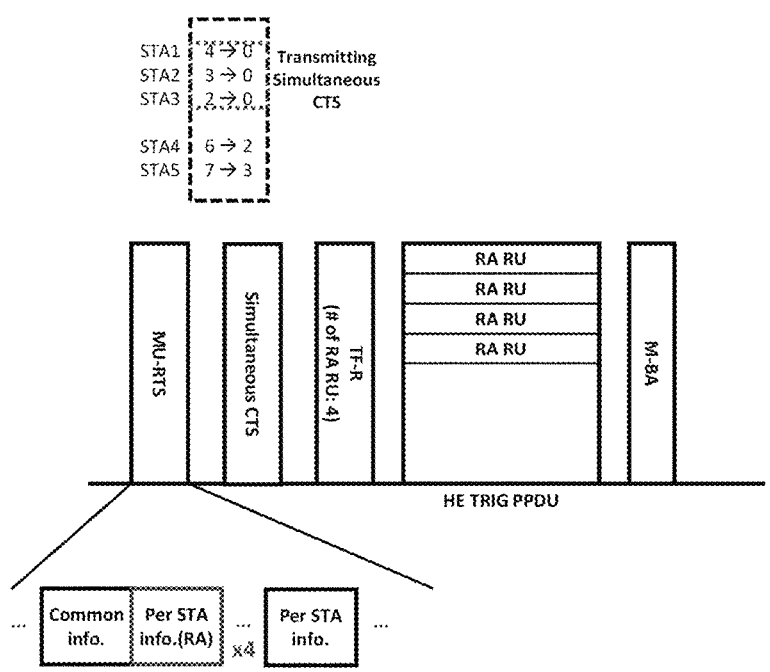
FIGS. 21 and 22 illustrate protection methods of the UL OFDMA-based random access procedure.
Figure 22:
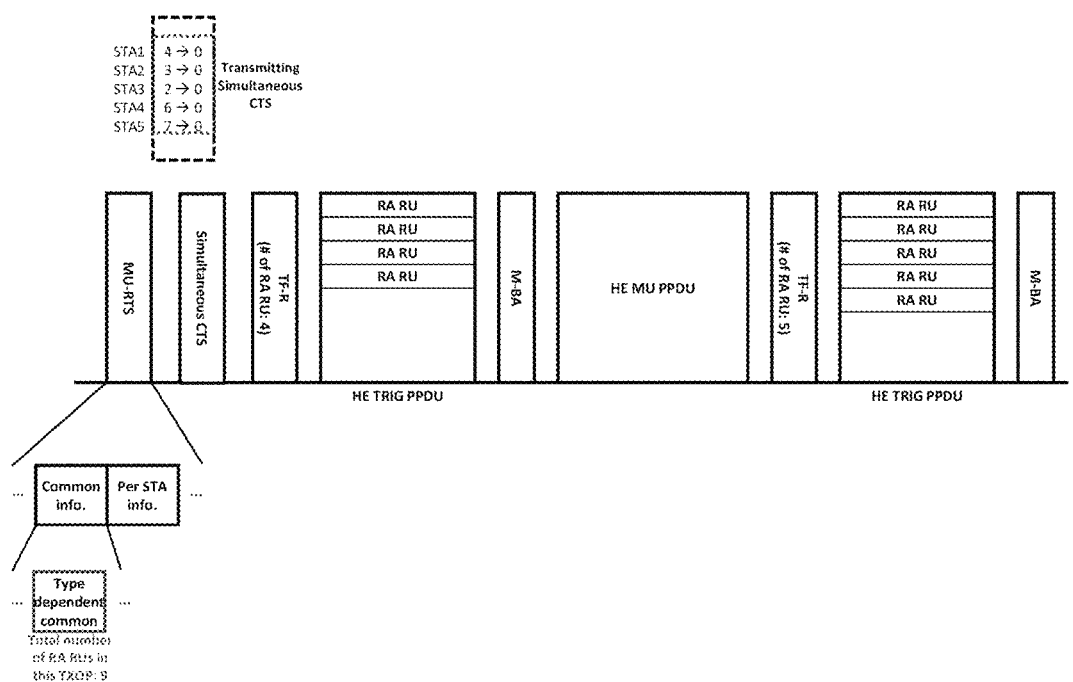

FIGS. 21 and 22 illustrate protection methods of the UL OFDMA-based random access procedure. A multi-user RTS (MU-RTS) may be used for protecting data transmission in a multi-user transmission process. The MU-RTS may have a variant format of the trigger frame and may solicit simultaneous CTS transmission of at least one recipient via a user information field. The recipients receiving the MU-RTS transmit simultaneous CTS after a SIFS time. The simultaneous CTS transmitted by multiple recipients has the same waveform. The neighboring terminals receiving the MU-RTS and/or the simultaneous CTS may set a network allocation vector (NAV).

According to the embodiment of the present invention, the UL OFDMA-based random access procedure can be protected through transmissions of the MU-RTS and the simultaneous CTS. However, in the random access procedure, it is not possible to determine in advance which STA will attempt random access for data transmission. If all of the STAs attempting random access transmit the simultaneous CTS, unnecessary protection may be performed up to the radio range of the STA that has failed in random access as well as the STA that has succeeded in the random access. As a result, performance of the adjacent network may be degraded. Therefore, a method for minimizing the number of STAs transmitting simultaneous CTSs among STAs performing random access is needed.

FIG. 21 illustrates an embodiment of a method for protecting the UL OFDMA-based random access procedure. According to an embodiment of the present invention, the AP may insert information on the number of random resource unit(s) to be used in the UL OFDMA-based random access procedure into the MU-RTS and transmit it. The STA attempting random access extracts the information on the number of random resource units from the received MU-RTS. The STA determines whether or not an OBO counter of the STA can be decremented to 0 in the subsequent UL OFDMA-based random access procedure by referring to the extracted information on the number of random resource units. If the OBO counter can be decremented to 0, the STA transmits a simultaneous CTS. However, if the OBO counter cannot be decremented to 0, the STA does not transmit a simultaneous CTS.

Referring to FIG. 21, the number of random resource units to be used in the UL OFMDA-based random access procedure is 4. The AP transmits information on the number of random resource units through an MU-RTS. STAs receiving the MU-RTS obtain the information on the number of random resource units, and determine whether an OBO counter of the corresponding STA can be decremented to 0 by referring to the obtained information. In this case, STA1, STA2 and STA3 having an OBO counter less than or equal to the number 4 of random resource units simultaneously transmit simultaneous CTSs. However, STA4 and STA5 having an OBO counter larger than the number 4 of random resource units do not transmit simultaneous CTSs because they cannot decrement the OBO counter to 0 in the subsequent UL OFDMA-based random access procedure.

According to the embodiment of the present invention, the MU-RTS may represent the information on the number of random resource unit(s) to be used in the subsequent UL OFDMA-based random access procedure in various methods. According to an embodiment, the MU-RTS may represent an identifier separately designated for random access through an AID field or a 'type-dependent per user info' field, and may repeat it as many as the number of random resource units(s). According to another embodiment, the MU-RTS may represent an identifier separately designated for random access through the AID field and information on the number of random resource unit(s) through the 'type-dependent per user info' field. According to yet another embodiment of the present invention, an identifier representative of the number of random resource units(s) may be specified and inserted into an AID field of a 'per user info' field of the MU-RTS. According to still another embodiment of the present invention, the MU-RTS may include a separate identifier for indicating random access, and may represent information on the number of random resource unit(s) through a specific resource unit pattern in a resource unit allocation field.

FIG. 22 illustrates another embodiment of a method for protecting the UL OFDMA-based random access procedure. When a plurality of UL-MU transmissions are performed in the same TXOP, the transmission and reception of MU-RTS and CTS for the target STAs in the entire UL-MU transmission process can be performed at a start of the TXOP. In this case, the AP may insert information on the total number of random resource unit(s) to be used in the UL OFDMA-based random access procedures to be protected into the MU-RTS and transmit it. The MU-RTS may represent information on the total number of random resource unit(s) to be used in subsequent UL OFDMA-based random access procedures, through at least one of the methods described in the embodiment of FIG. 21.

Referring to FIG. 22, two UL OFMDA-based random access procedures are performed in the same TXOP, and the total number of random resource units to be used in these processes is nine. The AP transmits the total number of random resource units via the MU-RTS. STAs receiving the MU-RTS obtain the information on the total number of random resource units and determine whether an OBO counter of the corresponding STA can be decremented to 0 by referring to the obtained information. STA1 to STA5 all have an OBO counter less than or equal to 9, so that the STAs may transmit simultaneous CTSs.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, the terminal comprising:
   a processor; and
   a communication unit,
   wherein the processor is configured to:
   receive contention window information related to a contention window for performing an uplink orthogonal frequency division multiple access (OFDMA)-based random access(UORA) of the terminal,
   wherein the contention window information includes a minimum value of the contention window, and
   wherein the contention window is configured based on the minimum value,
   select OFDMA random access backoff(OBO) counter within a range of the contention window, and
   receive a trigger frame including resource allocation information,
   wherein the resource allocation information is used to allocate one or more resources units,
   wherein the OBO counter is decremented by a number of the one or more resource units, and
   wherein the OBO counter is set to '0' when a value of the OBO counter is smaller than the number of one or more resource units allocated based on the resource allocation information.

2. The wireless communication terminal of claim 1, wherein an initial value of the contention window is set to the minimum value.

3. The wireless communication terminal of claim 1, wherein the processor is further configured to:
   select a resource unit among the one or more resource units, and
   perform carrier sensing on a channel containing the selected resource unit when a specific field included in the trigger frame indicates performing the carrier sensing,
   wherein the OBO counter is decremented by the number of the one or more resource units.

4. The wireless communication terminal of claim 3, wherein a new OBO counter is determined within the range of the contention window before a next trigger frame is received when the channel including the selected resource unit for uplink multi-user transmission in response to the trigger frame among the one or more resource units is busy according to the carrier sensing and the OBO counter is 0 or decreased to 0.

5. The wireless communication terminal of claim 4, wherein the processor is further configured to:
   participate in a subsequent UORA using the new OBO counter,
   wherein the uplink multi-user transmission does not performed through the selected resource unit when the channel is determined to be busy based on the carrier sensing, and
   wherein the new OBO counter is randomly determined within the range of the contention window.

6. The wireless communication terminal of claim 5, wherein the contention window for determining the new OBO counter has the same size as an existing contention window.

7. The wireless communication terminal of claim 3, wherein the uplink multi-user transmission is performed based on the selected resource unit when the channel including the resource unit is idle according to the carrier sensing and the OBO counter is 0 or decremented to 0.

8. The wireless communication terminal of claim 3, wherein the carrier sensing is performed during a SIFS time between the trigger frame and a PHY protocol data unit (PPDU) transmitted in response to the trigger frame.

9. The wireless communication terminal of claim 1,
wherein the OBO counter does not decrement when the trigger frame is received but there is no pending data to be transmitted to a base wireless communication terminal.

10. The wireless communication terminal of claim 1,
wherein the minimum value of the contention window is transmitted through a random access parameter set.

11. A wireless communication method of a wireless communication terminal, the method comprising:
  receiving contention window information related to a contention window for performing an uplink orthogonal frequency division multiple access (OFDMA)-based random access(UORA) of the terminal,
  wherein the contention window information includes a minimum value of the contention window, and
  wherein the contention window is configured based on the minimum value; and
  selecting OFDMA random access backoff(OBO) counter within a range of the contention window; and
  receiving a trigger frame including resource allocation information,
  wherein the resource allocation information is used to allocate one or more resources units,
  wherein the OBO counter is decremented by a number of the one or more resource units, and
  wherein the OBO counter is set to '0' when a value of the OBO counter is smaller than the number of one or more resource units allocated based on the resource allocation information.

12. The wireless communication method of claim 11,
wherein an initial value of the contention window is set to the minimum value.

13. The wireless communication method of claim 11, the method further comprising:
  selecting a resource unit among the one or more resource units; and
  performing carrier sensing on a channel containing the selected resource unit when a specific field included in the trigger frame indicates performing the carrier sensing,
  wherein the OBO counter is decremented by the number of the one or more resource units.

14. The wireless communication method of claim 11,
wherein a new OBO counter is determined within the range of the contention window before a next trigger frame is received when the channel including the selected resource unit for uplink multi-user transmission in response to the trigger frame among the one or more resource units is busy according to the carrier sensing and the OBO counter is 0 or decreased to 0.

15. The wireless communication method of claim 14, the method further comprising:
  participating in a subsequent UORA using the new OBO counter,
  wherein the uplink multi-user transmission does not performed through the selected resource unit when the channel is determined to be busy based on the carrier sensing, and
  wherein the new OBO counter is randomly determined within the range of the contention window.

16. The wireless communication method of claim 15,
wherein the contention window for determining the new OBO counter has the same size as an existing contention window.

17. The wireless communication method of claim 13,
wherein the uplink multi-user transmission is performed based on the selected resource unit when the channel including the resource unit is idle according to the carrier sensing and the OBO counter is 0 or decremented to 0.

18. The wireless communication method of claim 13,
wherein the carrier sensing is performed during a SIFS time between the trigger frame and a PHY protocol data unit (PPDU) transmitted in response to the trigger frame.

19. The wireless communication method of claim 11,
wherein the OBO counter does not decrement when the trigger frame is received but there is no pending data to be transmitted to a base wireless communication terminal.

20. The wireless communication method of claim 11,
wherein the minimum value of the contention window is transmitted through a random access parameter set.

* * * * *